Jan. 17, 1961　　　D. K. YANKEE　　　2,968,042
C-RING CLINCHING TOOL
Filed April 11, 1957　　　2 Sheets-Sheet 1
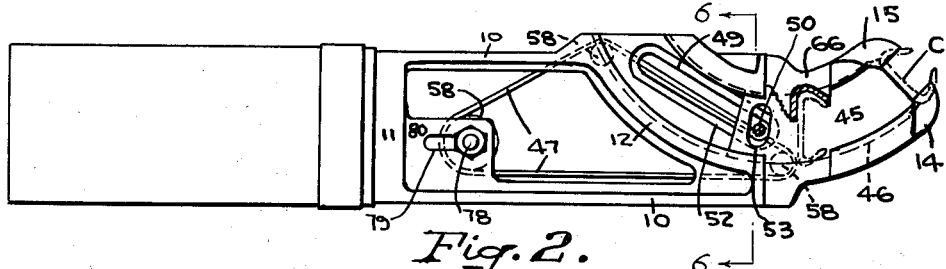
Fig. 2.
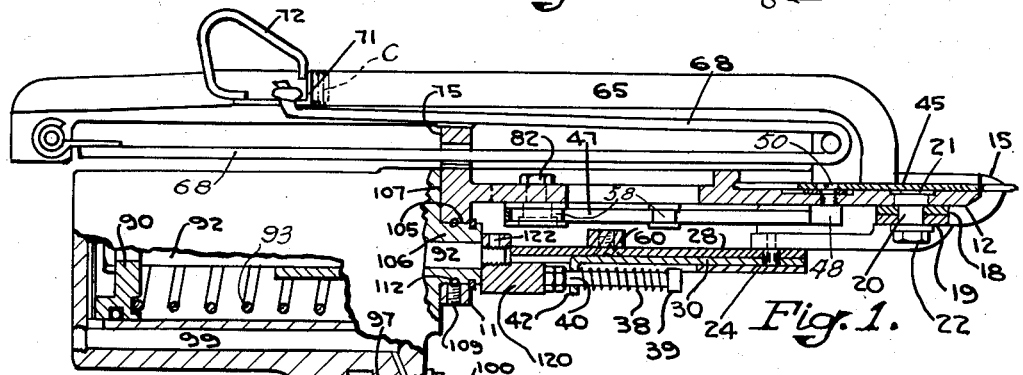
Fig. 1.
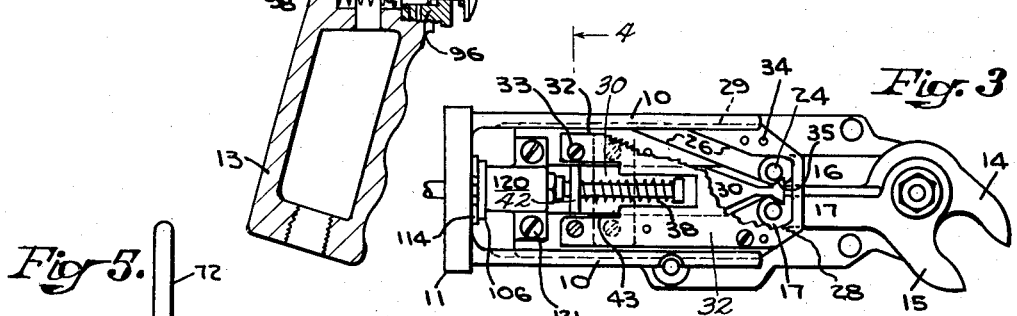
Fig. 3
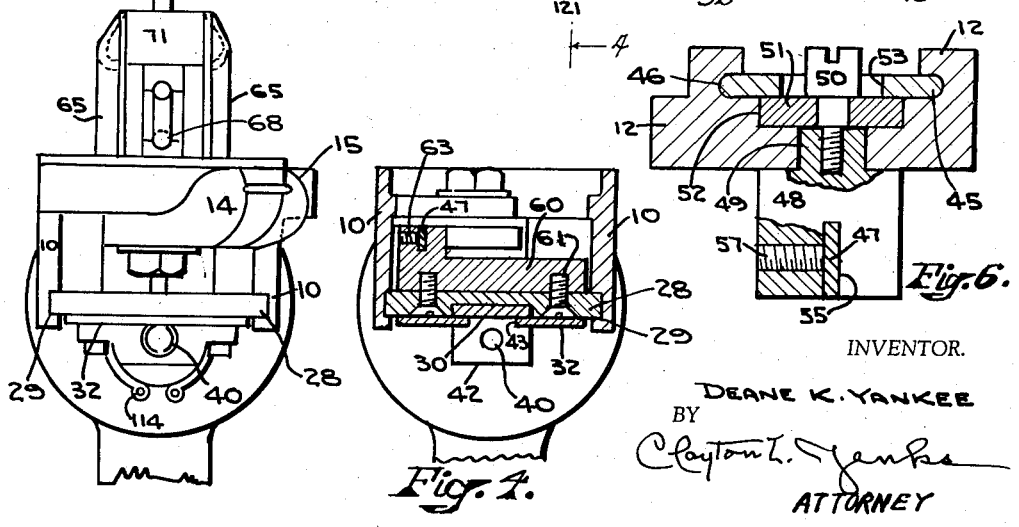
Fig. 5.
Fig. 4.
Fig. 6.
INVENTOR.
DEANE K. YANKEE
BY
Clayton L. Yankee
ATTORNEY

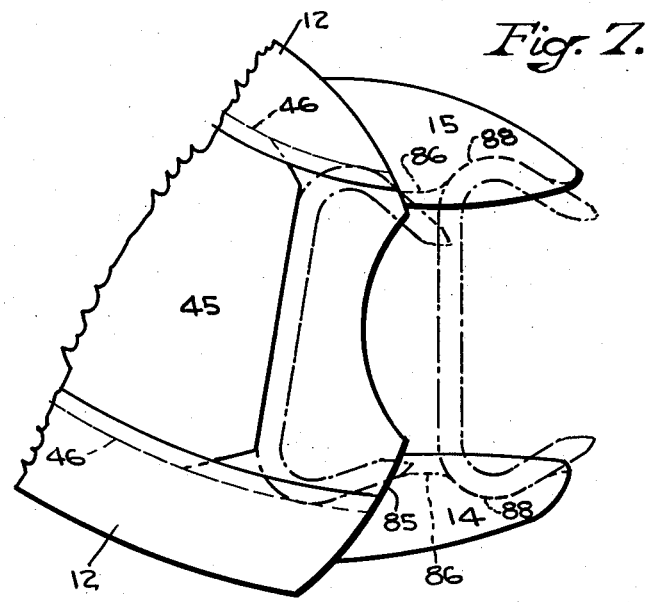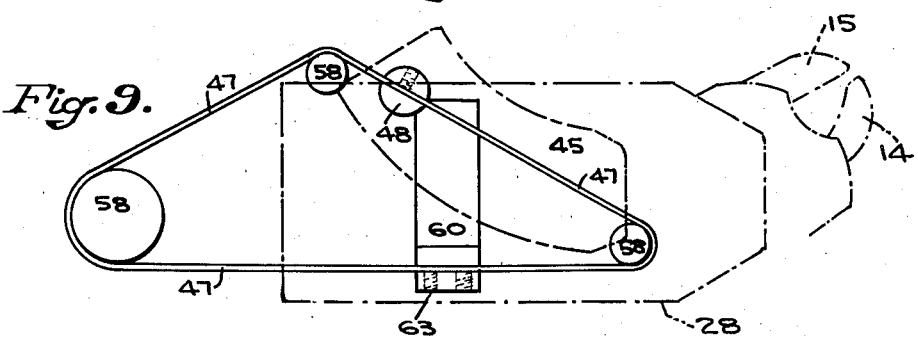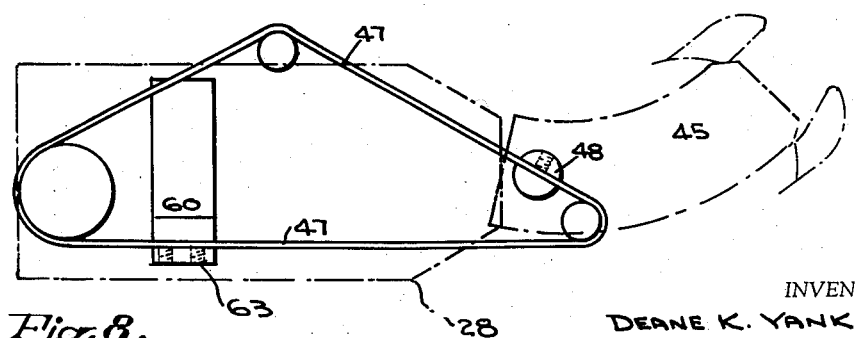

United States Patent Office 2,968,042
Patented Jan. 17, 1961

2,968,042

C-RING CLINCHING TOOL

Deane K. Yankee, Sterling, Mass., assignor to Novelty Tool Company, Inc., Spencer, Mass., a corporation of Massachusetts Filed Apr. 11, 1957, Ser. No. 652,127

12 Claims. (Cl. 1—187)

This invention relates to a power actuated C-ring clinching tool, and more particularly to a tool which will present an open ring to an article to be fastened thereby and bend the ring arms into a closed position.

This case relates to a tool of the general type of that shown and claimed in the prior application of Albrecht and Yankee, Serial #641,878, filed February 25, 1957, now Patent No. 2,921,315.

One feature of the present invention relates to a tool construction which provides for feeding a ring from a magazine through a pusher slideway to a pair of angularly arranged clinching jaws where the ring lies at an angle to the center line of the tool body but remains in the plane of the slideway, so that the ring may be readily applied into corners or other difficultly accessible locations.

A further object of the invention pertains to presenting the ring to the angularly positioned clinching jaws in such a manner that the ring is held under a resilient pressure and in a jaw pocket so arranged that the ring is firmly positioned for introduction to a work piece but the ring arms are not distorted prior to the clinching operation.

Another object is to provide a construction whereby the rings may be fed serially to the pusher slideway from a supply magazine, comprising a feed trough arranged parallel with the tool body, and then be moved in an arcuate path into the clinch jaws.

A further object is to provide a power operated cam mechanism arranged to close the jaws positively and including a resiliently operating device which yieldingly urges the jaws into a clamping engagement with the ring when presented by the pusher so as to hold the ring firmly in position for the clinching operation.

Another object is to provide a construction of this type in which the cam mechanism comprises a cam operating on a forward motion to close the jaws and a ring pusher which is connected resiliently to the jaws to urge them yieldingly into a gripping engagement with a ring presented angularly thereto.

Another object is to provide a construction of this type in which the forwardly moved cam arranged to close the angularly arranged jaws is connected through a mechanical device to move the ring pusher slide rearwardly when the jaws are closed and to move that slide positively forward to feed a ring to the jaws when the jaw closing slide moves rearwardly.

A further object is to provide a construction in which the jaw operated mechanism is positively moved by means of a pneumatically operated piston, and wherein the piston chamber is pivotally mounted on the tool body in such a manner that the handle carrying the tool will remain in a downward position irrespective of the angular position of the jaws. Other objects will be apparent in the following disclosure.

In accordance with my invention, I have provided a power tool, operated preferably pneumatically, which comprises a pair of cam operated C-ring clinching jaws arranged at an angle to the center line of the tool body. The tool has a ring feed magazine on the tool body connected to present a ring to a feed groove and a pusher slide serves to move the ring along the groove in an arcuate path to the angularly arranged jaws. The rings are clinched by a positively moved cam connected to close the jaws, and when that cam moves to open the jaws a pusher slide, preferably operating in an arcuate slideway, is positively moved to feed the ring forward. That pusher slide is connected through a resilient yielding device with the jaws so that the ring is frictionally held by the jaws prior to its being bent and clinched. The jaws may be held at a desired angle relative to the handle support.

Referring to the drawings illustrating one embodiment of the invention:

Fig. 1 is a vertical and central section through the tool;

Fig. 2 is a fragmentary top plan view of the tool but with the ring feed magazine removed;

Fig. 3 is an under side plan view, with parts broken away to show the operation of the device;

Fig. 4 is a section on the line 4—4 of Fig. 3;

Fig. 5 is a front elevational view of the jaw end of the device;

Fig. 6 is a fragmentary section on the line 6—6 of Fig. 2;

Fig. 7 is an enlarged fragmentary somewhat diagrammatic view of the ring feed grooves in the jaws and tool body; and Figs. 8 and 9 are diagrammatic views showing the operation of the endless belt movement of the pusher slide with the pusher in its two end positions.

The C-ring clinching tool illustrated in the drawings is a gun type of tool having a body comprising two spaced vertical ribs 10 connected at the rear by a vertical frame portion 11 and at the front by an arcuate portion 12. The space between the ribs 10 is arranged for sliding members which feed the C-rings C (Fig. 2) and operate the jaws. The body is supported by a gun type of handle 13. The two jaws 14 and 15 are formed as the front ends of two levers of the first class which have rearwardly projecting portions 16 and 17 and central disc-shaped portions 18 and 19 shaped as thin plates. These plates are pivotally mounted on a pivot pin 20 (Fig. 1) having a head 21 mounted in a recess in the front portion 12 of the body and projecting downwardly through a hole. The pin is held in place below the discs 18 and 19 by means of a nut 22 engaging the under plate 19.

The jaws 14 and 15 are shaped to hold a C-ring therebetween, and they are separately movable by cam members which cause the jaws to move toward each other and close the ring. To effect this closing movement, the rear ends of the jaw levers 16 and 17 are each provided with offset cam followers 24 shaped as parallel cylindrical pins. These pins ride in cam slots 26 in a slide plate 28 which is slidably mounted within slots 29 in the side walls 10 of the body and moved by a pneumatic piston or by a solenoid, if desired. The cam plate 28 has parallel upper and lower faces and parallel sides which provide for this sliding movement.

A second cam plate 30 is mounted within a longitudinal recess on the under side of the cam plate 28, as shown in Fig. 4. This lower cam plate 30 is held in the recess of the upper plate by means of a U-shaped retaining plate 32. This plate is cut out, as shown in Fig. 3, to provide space for the operating parts. The plate is held in place by means of suitably affixed cap screws 33 and suitably positioned dowels 34. The lower cam plate 30 has a nose portion provided with diverging cam faces 35 which are also arranged to engage the lever pins 24. The cam slots 26 in the slide plate 28 diverge rearwardly of the tool and are so arranged that their inner faces engage the pins 24 when the cam plate 28 is moved forward towards the right and thus cause the pins 24 to separate and move the jaws 14 and 15 toward each other. This cam movement closes the C ring. When the plate 28 is moved rearwardly, the outer walls of the cam slots cause the jaws to separate. The cam faces 35 of the lower plate 30 extend in the opposite direction, so that when the slide plate 30 moves rearwardly, these cam faces likewise tend to separate the pins 24 and urge the jaws toward each other.

A primary feature of this construction is a modification of the construction shown in said prior application. In the present case, the jaws are closed by the positive cam action of the pins 24 riding on the inner surfaces of the cam slots 26 when the cam plate 28 is forced forward toward the jaws. The lower slide plate 30 is L-shaped and has its forward dove-tailed cam nose 35 resiliently urged rearwardly towards the left in Fig. 3 by a spring 38 mounted between the head 39 of a rod 40 and a lug 42 projecting downwardly from the rear of the under plate 30. This spring is of sufficient strength and is maintained unde compression so that it at all times tends to urge the lower plate 30 rearwardly and cause its diverging cam faces 35 to urge the lever pins 24 away from each other and thus provide a resilient pressure on a C-ring while it is being introduced into or is frictionally held between the spaced jaws 14 and 15, as explained below. The retainer plate 32 is cut out at 43, as shown in Fig. 3, to provide space for movement of the cam plate lug 42 without interference.

Another feature of this invention pertains to having the jaws 14 and 15 extend obliquely relative to the longitudinal center line of the tool body, as best shown in the top plan view of Fig. 2 and the under side view of Fig. 3. These jaws are so positioned that the C-ring mounted therebetween has its central plane remaining always in the plane of its movement through a feed channel in the jaw supporting body. As shown, the C-ring is moved forward longitudinally of the tool body and then carried around a curved channel in such a manner that the ring has its arms projecting obliquely and upwardly (Fig. 2) at an angle of about 45° relative to the center line of the body. This oblique positioning of the C-ring makes it easy to apply the C-ring to a work piece close to an obstructing ledge or wall.

A major problem involves feeding the C-ring into its obliquely arranged jaws. For this purpose I provide an arcuate shaped pusher slide 45 mounted to ride in inwardly facing correspondingly shaped slideways 46 in the body portion 12 (Figs. 1, 2 and 6). The pusher 45 and its mounting slots are so shaped that the pusher may be moved readily along its arcuate path to move the C-ring into the jaws 14 and 15. The slideways 46 are formed by milling upstanding rib portions of the frame 12 to provide concentric grooves, and the pusher 45 has its sides shaped to interfit with the slideways.

The arcuate pusher plate 45 is moved by a mechanical connection with the upper slide plate 28 and so arranged that when the cam plate is moved rearwardly to open the jaws, the pusher plate 45 is moved forward to feed a ring into the jaws. A suitable connection between the cam plate 28 and the pusher plate 45, as shown in Figs. 2 and 6, comprises an endless belt 47 connected at one point to a round stud 48 extending downwardly through a slot 49 in the body 12 and secured to the C-ring pusher 45 by means of a guide pin 50. The pin 50 has a reduced portion passing through a washer 51 and is threaded into the reduced portion of the stud 48. The washer slides in parallel guideways 52 in the body portion 12. The guideway 52, as shown in Fig. 2, is straight. The pusher 45 has an elongated transverse slot 53 through which the top of the stud 50 projects. Thus, as the slide 45 moves in its arcuate path, the stud may move transversely of the slot 53.

To cause movement of the C-ring pusher slide 45, the stud 48 is slotted at 55 and has the endless belt 47 secured in the slot by means of a set screw 57. This endless belt passes around three pulleys 58 (Fig. 2) suitably mounted on pivot pins carried by the body of the tool. The belt is connected to the upper slide plate 28 by means of an L-shaped block 60 (Fig. 1) which is secured as by cap screws 61 to the plate. As shown in Fig. 4, the belt 47 is mounted in a slot within the upstanding portion of that L-shaped member 60 and is held in place by means of two set screws 63. When the slide 28 moves forward, the block 60 and the attached belt 47 move together. The belt is preferably made as a flat band of rubberized canvas, but may be made of other suitable material. The rearward movement of the block 60 on the slide plate 28 draws back on the endless belt, and because the opposite run of the belt is fastened to the stud pin 48 of the C-ring pusher plate 45, the latter is forced to move forward in its arcuate slot.

A supply of C-rings is provided by a substantially U-shaped trough or guide 65 within which the C-rings are fed (Fig. 1). One end of the guide is fastened to a plate 66 (Fig. 2) suitably connected by screws to the body 12. The C-rings are urged towards the tool jaws by means of a highly elastic rubber cord 68 suitably secured at one end to a fixed portion of the guide body 65. The other end of the rubber band is connected to an L-shaped slide plate 71 which has a suitable handle 72 attached thereto. This handle serves for drawing back on the plate 71 to provide for introducing a new supply of C-rings. The slide plate 71 moves within the guide trough and has the handle 72 slidable between the spaced flanges of the trough, as is indicated in Fig. 5. The rubber cord has sufficient resiliency to force the C-rings along the guide trough and around the bend and then through the forwardly extending opening in the plate 66 and into position for being forced toward the jaws. Thus, one ring at a time is positioned ahead of the pusher plate 45 after the latter has been drawn to its rearmost position. When the cam plate 28 moves rearwardly, the plate 45 picks off the lower ring in the downwardly extending portion of the trough 65 and moves it forward toward the jaws.

The trough 65 is further supported by an intermediate bracket 75 (Fig. 1) which is suitably secured by screws to the upstanding cross piece 11 of the body. The bracket has a hole therethrough so that the rubber cord 68 may pass through it. The left hand pulley 58 is shown in Fig. 2 as having its pivot post 78 slidably mounted in a longitudinally elongated slot 79 in a ledge 80 projecting forward from the cross piece 11. The pivot post has an enlarged head (Fig. 1) at its lower end adapted to be drawn up against the under side of the framework 80 by means of an adjustable nut and washer 82. Thus, any slack in the belt may be readily taken up so as to insure a proper forward motion of the C-ring.

As above indicated, the C-ring is moved under resilient pressure to a position between the jaws 14 and 15. As best shown in the enlarged fragmentary view of Fig. 7 which shows a C-ring in two positions, the arcuate channels 46 along which the C-rings are fed, after they have been picked off from the bottom of the pile in the feed trough, end at an inwardly projecting ledge 85 on each of the jaws. This ledge portion which projects inwardly only to a slight extent has a groove or channel 86 therein raised above the channel 46 by about the diameter of the wire at each side and serving as the ring guide. When the pusher 45 moves the ring 48 forward from its rearward position, each forwardly projecting arm portion of the ring is guided by the projecting nose portion of the ledge at the entrance to the short transverse channel 86. A further forward motion of the pusher 45 moves the ring into the narrow channels 86 of the jaws and forces the jaws to separate as is provided by the resilient action of the spring 38. Each of the jaws is provided with inwardly facing pockets 88 which also have undercut surfaces or grooves to hold the ring in position. When the ring is pushed beyond the outwardly projecting portion 86 of the narrowed part of the jaws, it is thrust into the grooves of those two pockets and into its final position with its arms projecting forwardly beyond the jaws. The C-ring is frictionally held in position in the pockets 88 of the jaws 14 and 15 by the pressure of the spring 38 acting through the cam faces 35 of the lower slide which thrust the jaw pins 24 outwardly and thus clamp the jaws yieldingly against the C-ring arms. It will be observed that the rear portions of the arcuate slots 88 in the jaws provide a seat which prevents any rearward motion of the C-ring when it is thrust under force into a fabric or any other desired position of utility.

The cam plate 28 may be moved forward by a suitable power mechanism such as a solenoid but preferably by means of the air cylinder piston 90, Fig. 1. The piston rod 92 is connected positively to the cam plate 28 so that the plate is positively moved thereby. Air is suitably admitted to the piston chamber from a compressed air supply connected to the hollow gun type handle 13. To control the air, a suitable three way valve 96 is provided. This, as illustrated in Fig. 1, comprises a plunger 97 normally urged toward the right by a spring 98 to close the air flow to the supply passage 99 which opens at the rear of the piston 90. By pushing the thumb button 100 against the spring 98, the plunger 97 is moved rearwardly and air is admitted to the piston chamber. When the button 100 is released, air may escape from the rear side of the piston into the space around the stem of that button.

Since it is desirable to have the handle 95 always projecting downwardly, I have so mounted the operating portions of the tool on the piston and handle part that the tool jaws as well as the feed supply of rings may be rotated relative to the piston and handle. This is provided by having the rear wall 11 of the body provided with a cylindrical hole 105 (Fig. 1) which is adapted to slidably fit upon a corresponding projecting boss 106 formed as a part of the front wall 107 of the piston chamber. The wall 11 has a hole therein within which a screw 109 is threaded. Beneath this screw is a spring pressing against a ball 112 which is arranged to be positioned in any one of a set of spaced recesses in the boss 106. Thus these parts are so arranged that the jaw portion of the tool and the C-ring carrier may be rotated through any angle as provided by the ball seats, subject of course to the feed trough striking the side of the handle. This provides for an adequate rotation of the tool jaws so that they may project upwardly, laterally or downwardly as desired for any particular operation. A horseshoe shaped resilient lock ring 114 (Fig. 5) is suitably mounted in grooves in the end of the boss to hold the parts together. It will also be appreciated that the C-rings are not enclosed to any material extent during their transfer from the feed trough to the jaws, so that if a ring has been damaged or is distorted in shape and jams in the feed grooves or jaws, it may be readily removed.

The piston 92 is connected to the rod 40 as well as to the main cam plate 28 through the L-shape piece 120 (Figs. 1 and 3) fastened to the upper cam plate 28 by screws 121. The piece 120 has a threaded hole connected to the threaded end of the piston rod 92. The latter is locked to the place 120 by a set screw 122. The rod 40 is threaded into a socket in the L-piece, so that the rod moves with the upper cam plate and the spring 38 is maintained under substantially the same compression at all times.

The operation of the device will now be apparent. When air is admitted to the rear of the piston 90, the upper cam plate 28 is moved forward towards the right. This cam plate acts through the cam followers in the diverging cam slots 26 to spread the cam followers 24 apart and thus move the jaws toward each other to clinch the C-ring to its final closed condition. At the same time that the cam plate 28 moves forward, the endless belt 47 serves to pull the pusher plate 45 rearwardly in its arcuate slot, so that its front end is now at the rear of the feed channel through which the C-rings are supplied. The two end positions of the pusher are shown in Figs. 7 and 8. Upon releasing the valve button 100, the air escapes from the rear of the piston under the force applied by the spring 93 and the cam plate 28 moves rearwardly. This causes the endless belt 47 to move the pusher plate forward and thrust a C-ring into the jaws. As shown in Fig. 3, the slots 26 in the positively moved cam plate 28 terminate at the right in wide parallel portions which provide freedom of motion for the jaw pins 24 at this location. The spring 38 acting between the plunger head 39 and the downwardly projecting lug 42 of the lower cam plate 30 tends to draw its dovetailed cam 35 rearwardly and thus spread the pins 24 apart to close the jaws slightly. At the same time that the piston spring 93 is moving the upper cam plate rearwardly, the ring pusher is moved forward and ultimately pushes a ring into the jaws. The rearward movement of the upper cam plate operates through the endless belt 47 to move the pusher plate 45 forward in a timed relationship to feed a single C-ring into the jaws. Then, as above explained with reference to Fig. 7, the C-ring is forced past the constricted passage formed by the humps or ledges 85 on the jaws and into the pockets 88 of the jaws. The hump 85 causes the jaws to separate for the purpose, as is permitted by the resilient action of the spring 38. Further forward movement of the pusher 45 slips the ring down into its final position in the pockets 88 of the jaws where the ring has its arms projecting, as illustrated. That is, the arms of the ring are presented to a work piece at an oblique angle relative to the longitudinal center line of the tool body. The C-ring, as above indicated, projects at a suitable angle, such as 45°, to the center line of the tool, so that as shown in Fig. 2, one arm of the C-ring projects outwardly beyond the other and the ring may thus be inserted readily into an obstructed corner position of application. The tool may be used in any desired position for applying the C-ring.

Various modifications may be made in the device to meet the requirements of the industry. For example, the arcuate slideway may be replaced by a straight one, if the jaws are not to be arranged angularly as herein described. Also, the arcuate slideway may be used with other constructions, such as where the spring 38 and associated parts are omitted and the pusher serves to force the ring between rigidly positioned jaws with a necessary distortion of the ring. Other changes will be readily apparent as falling within the scope of this invention.

I claim:

1. A C-ring clinching tool comprising a body, a manually controlled reciprocable power operated tool mounted on the body, a pair of jaws movably mounted on the body which have grooves arranged for receiving and holding a U-shaped C-ring with its legs projecting forward at an obtuse angle relative to the longitudinal center line of the body and with one leg in advance of the other, a magazine for supplying C-rings, means including a slideway arranged to receive a ring from the magazine and a pusher operated by said tool and reciprocable in the slideway to feed a C-ring into said angular arrangement in the jaw grooves, the center lines of the slideway and the jaw grooves lying substantially in a plane parallel with the center line of the body, and means operated by the tool to move the jaws and clinch a ring held therein.

2. A C-ring clinching tool comprising a body, means on the body providing a supply of C-rings, a pair of jaws pivotally mounted on the body for clinching a C-ring supported thereby, an arcuate slideway lying substantially in a plane for receiving a C-ring from the supply, an arcuate pusher in said slideway for moving a C-ring in the slideway to the jaws, means for moving the pusher to feed a ring forward and means acting in timed relation with the pusher movement for causing the jaws to clinch the ring.

3. A C-ring clinching tool comprising a body, means thereon providing a supply of C-rings, a pair of jaws pivotally mounted on the body and extending obliquely at an angle relative to the body center line, an arcuate ring receiving slideway extending from said supply to the jaws, an arcuate pusher movable in said slideway to push a C-ring to the jaws, a power operated cam plate and cam followers connected with the jaws for closing the latter when the cam plate is moved forward, and mechanism connecting the cam plate with the pusher which serves to move the pusher forward to feed a C-ring when the cam plate retreats to open the jaws.

4. Apparatus according to claim 3 comprising means which yieldingly urges the jaws into frictional engagement with the C-ring when the latter is fed thereto.

5. A C-ring clinching tool comprising a body having a C-ring feeding slideway, a pair of jaws pivotally mounted on the body and having C-ring grooves communicating with said slideway, a power operated cam plate and cam followers connected with the jaws which serve to close the jaws when the cam plate is moved forward, a second cam plate having cam surfaces thereon arranged to contact with the followers and urge the jaws toward a closing movement when it is moved in a rearward direction, and means including a spring which resiliently urges the second cam plate rearwardly to cause the jaws to close against and frictionally engage a ring feed thereto.

6. A tool according to claim 5 in which the second cam plate is connected to the power operated plate for movement therewith, said connection including a part movable with the power moved plate and a spring connecting said part with the second cam plate.

7. A C-ring clinching tool according to claim 5 in which the power operated cam plate and the second cam plate have their cam faces diverging in opposite directions, so that the power operated cam plate will close the jaws when moved in a given direction and the second cam plate will tend to close the jaws when moved in an opposite direction.

8. A C-ring clinching tool comprising a body, a pair of jaws pivotally mounted thereon, a movable cam and cam followers connected with the jaws which serve to close the jaws, a C-ring feed magazine mounted on the tool body, means including a pusher for transferring a C-ring from said magazine to the jaws, a pneumatic power tool having a piston chamber, a piston and a piston rod slidably mounted in the chamber, a power control handle depending from the chamber, means for mounting said body on the power tool chamber for rotation about the piston rod axis, resiliently urged locking means for releasably securing the body and chamber in any of several relatively adjusted positions, said body and power tool being relatively rotatable so that a ring mounted in the jaws may be presented to a work piece at a desired angle, and means for connecting the piston rod with the cam and pusher to move the same for any position of the tool relative to the body.

9. A C-ring clinching tool comprising a body having a ring transferring slideway, a pair of jaws pivotally mounted on the body which have ring receiving grooves communicating with said slideway and arranged to present a ring at an oblique angle to the beginning of said slideway but in substantially the plane thereof, a pusher movable in said slideway, means including a power operated cam and cam followers which serve to close the jaws and clinch the ring and means including an endless belt connecting said cam with said pusher which is so arranged that when the cam moves forward the pusher moves rearwardly.

10. A tool according to claim 9 in which the slideway and pusher are arcuate and arranged for presenting a C-ring obliquely relative to the body center line.

11. A C-ring clinching tool comprising a body having a ring transferring slideway, means including a slide movably mounted in said slideway for feeding a C-ring forward, a pair of jaws pivotally mounted on the body which have ring receiving grooves communicating with said slideway, the grooves of said jaws having inwardly projecting portions forming a constricted passage requiring a slight opening of the jaws when the ring is fed forward and thereafter preventing rearward movement of the ring, and means which resiliently urges the jaws toward each other and permits a yielding movement of the jaws when the ring is forced through the constricted passage so that the ring is held without distortion by frictional engagement within the jaws.

12. A hog ring clinching tool comprising a frame, a pair of levers pivotally secured to said frame, normally opened clinching jaws forming one end of said levers and angularly disposed with respect to the body of said tool, normally closed actuating ends forming the opposite ends of said levers and disposed in parallel relation to the body of said tool, means operating said levers and secured to said frame and extending between said actuating ends of said levers and opening said normally closed actuating ends and closing said normally opened clinching jaw ends, and hog ring pushing means attached to said operating means to advance said hog ring between said clinching jaws and close said hog ring when said tool is operated.

References Cited in the file of this patent
UNITED STATES PATENTS

| | | |
|---|---|---|
| 2,511,795 | Cote | June 13, 1950 |
| 2,730,719 | Steiner | Jan. 17, 1956 |